Figure 1:
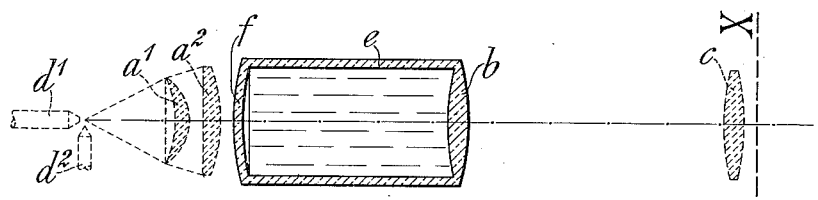

UNITED STATES PATENT OFFICE.

RUDOLF STRAUBEL, OF JENA, GERMANY, ASSIGNOR TO THE FIRM OF CARL ZEISS, OF JENA, GERMANY.

COOLING-CHAMBER FOR PROJECTION PURPOSES.

1,107,725.  Specification of Letters Patent.  Patented Aug. 18, 1914.

Application filed May 22, 1914. Serial No. 840,362.

*To all whom it may concern:*

Be it known that I, RUDOLF STRAUBEL, a citizen of the German Empire, residing at Jena, Germany, have invented a new and useful Cooling-Chamber for Projection Purposes, of which the following is a specification.

The invention relates to a new kind of cooling chamber for projection purposes, the distinguishing features of which, as compared with the constructions hitherto in use, are its simplicity, reliability and cheapness. These advantages are obtained, by the parts bounding the cooling chamber being fused with the vessel, which consists of glass, and the boundary of the chamber being formed at least on one side by a lens. By the fusing of the closing parts with the glass vessel, the chamber is rendered water-tight in a permanently reliable manner, in spite of a simple mode of construction, while the bounding of the chamber by a lens results in a simplified combining of the same with the lighting system.

According to the number and disposition of the cooling chambers in the lighting system the invention results in different constructional forms. A simple kind is formed by the cooling chamber being given a tubular shape and being bounded at one side by a lens and at the other side in a well-known manner by a plane plate or by an arched plate. If the cooling chamber be chosen of such a size that it fills up the space between two of the lenses of the lighting system, it can be bounded on either side by a lens fused to the glass vessel. Should it be desired to still further extend the chamber, two of the same or two different chambers of either of the two above-mentioned kinds may be combined to form one joint cooling chamber, so that one of the lenses of the lighting system comes to lie within such a cooling chamber. In this case the lens, which is within the chamber, need not be fused to the glass vessel.

In the annexed drawing Figures 1 to 5 show five different constructional examples of the invention, each by a longitudinal section.

It is assumed in all the examples, that a cooling chamber is built into a lighting system, in which behind a condenser system $a^1$, $a^2$ there is disposed a collective lens $b$ and behind the latter an auxiliary condenser lens $c$. The collective lens $b$ is located approximately at the locus of the image of a source of light, which is indicated by two carbons $d^1$ and $d^2$ of an electric arc lamp, while the auxiliary condenser lens $c$ lies near the image-plane X X of a projection system not shown in the drawing.

The cooling chamber is in each case formed by a glass tube $e$, which is fused at both ends with the closing parts. In the first example (Fig. 1) the cooling chamber is bounded at one side by a lens, the collective lens $b$, and at the other side by an arched plate $f$. In the second example (Fig. 2) the cooling chamber is closed at one side by the collective lens $b$ and at the other side by the auxiliary condenser lens $c$. In the third example (Fig. 3) two cooling chambers corresponding to Fig. 1 are united, so that the collective lens $b$ comes to lie within the glass tube.

Figure 2:
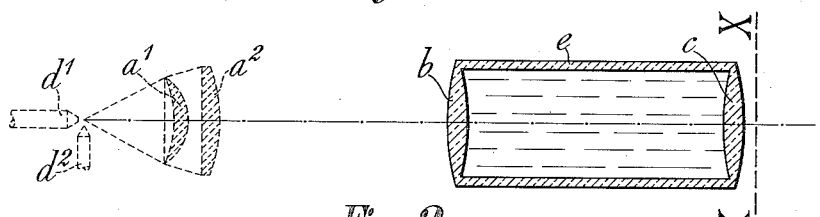
Figure 3:
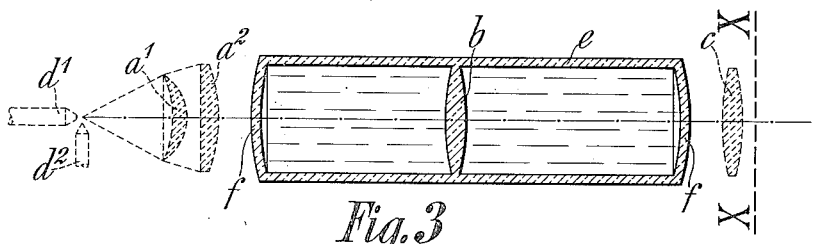
Figure 4:
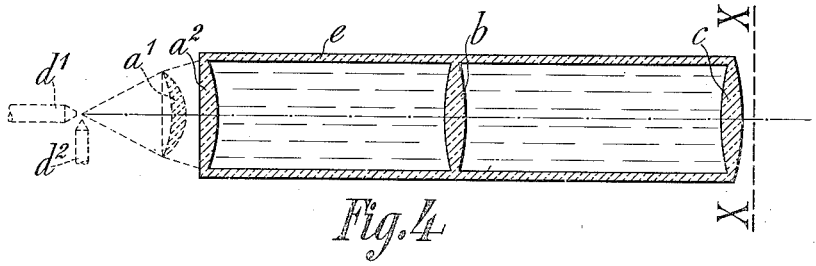
Figure 5:
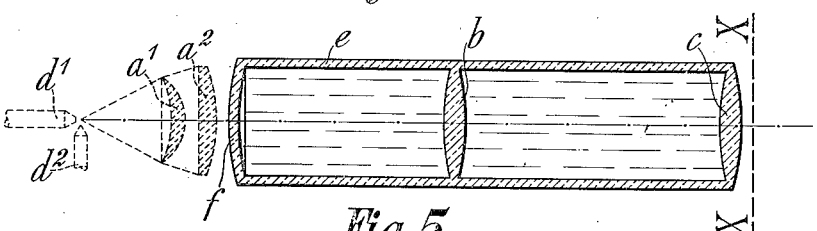

Fig. 4 shows the same combination of two cooling chambers corresponding to Fig. 2, while Fig. 5 represents in the same way a combination of the first example with the second.

I claim:

A cooling chamber for projection purposes, consisting of a glass vessel adapted to contain a liquid, two parts of which vessel, intended for the passage of the rays of light, are fused to the said vessel, at least one such part being formed by a lens.

RUDOLF STRAUBEL.

Witnesses:
  PAUL KRÜGER,
  FRITZ SANDER.